United States Patent [19]

Baker

[11] 4,209,711
[45] Jun. 24, 1980

[54] TRANSISTOR POWER CIRCUIT WITH PREVENTIVE DIODE BRIDGE

[75] Inventor: Richard H. Baker, Bedford, Mass.

[73] Assignee: Exxon Research & Engineering Co., Florham Park, N.J.

[21] Appl. No.: 930,907

[22] Filed: Aug. 4, 1978

[51] Int. Cl.² ............................................. H02M 7/48
[52] U.S. Cl. ................................... 307/104; 307/246; 307/257; 363/31; 363/56
[58] Field of Search ............... 307/104, 240, 243, 257, 307/246, 254, 315; 361/159, 152, 160; 363/123, 131, 132, 133, 134, 55, 56, 31; 318/807, 812

[56] References Cited

U.S. PATENT DOCUMENTS

| | | | |
|---|---|---|---|
| 3,284,641 | 11/1966 | St. John | 307/297 X |
| 3,573,501 | 4/1971 | Diehl | 307/257 |
| 3,796,894 | 3/1974 | Marchetti et al. | 307/257 |
| 4,125,814 | 11/1978 | Baker | 307/254 X |

Primary Examiner—L. T. Hix
Assistant Examiner—James L. Dwyer
Attorney, Agent, or Firm—Kenneth Watov

[57] ABSTRACT

Chopped current is supplied to an inductive load from a DC source that is switched by a pair of transistors having stacked emitter-collector paths between terminals of the source. Bases of the transistors are driven so that current can be supplied to the load from the source through the emitter-collector path of a first of the transistors during a first interval while the emitter-collector path of a second of the transistors is cut off. Current can flow from the load through the emitter-collector path of the second transistor during a second interval while the emitter-collector path of the first transistor is cut off. A diode bridge circuit connected between the emitter-collector paths and to the load, as well as to a bias circuit for one of the transistors, prevents current flow through the emitter-collector path of the first transistors while the second transistor is conducting regardless of the tendency of the base drive for the transistors to render the transistors simultaneously into a conducting state.

28 Claims, 2 Drawing Figures

TRANSISTOR POWER CIRCUIT WITH PREVENTIVE DIODE BRIDGE

TECHNICAL FIELD

The present invention relates generally to power transistor circuits wherein an inductive load is driven from a DC source that is switched by a plurality of stacked transistors and, more particularly, to such a circuit wherein a bridge connected between the stacked transistors assures that only one of the transistors can conduct at a time.

BACKGROUND ART

One type of prior art circuit for supplying current to relatively high power, inductive loads includes a DC source that is connected to a plurality of stacked power transistors. To simplify the exposition, it is assumed that two transistors are stacked between terminals of the DC source, but it is to be understood that any number of plural transistors can be stacked between terminals of the DC source. The pair of transistors is arranged so that emitter-collector paths thereof are in series across electrodes of the DC source. The transistors are driven by a reference so that only one of the transistors is supposed to conduct at a time. A load is connected in shunt with the emitter-collector path of one of the transistors, i.e., between one electrode of the DC source and a tap between the emitter-collector paths of the two transistors. The transistors are driven in an out-of-phase relationship by a variable pulse width waveform so current applied to the load has a close resemblance to a sinusoidal wave, due to filtering by the load.

It has been found that it is essential for the two stacked transistors never to conduct simultaneously. Simultaneous conduction of the two stacked transistors can have disastrous results on the DC power supply because the power supply is effectively short circuited by simultaneous conduction of the stacked transistors. However, because of various factors, such as lack of synchronization between the variable pulse width waveforms that drive the stacked transistors, the stacked transistors are occasionally inadvertently driven into simultaneous conduction.

In the past, simultaneous conduction of the stacked transistors has been avoided by sensing the current through the emitter-collector paths of the stacked transistors. In response to simultaneous current flow through the emitter-collector paths of the stacked transistors, a switching mechanism for the DC power supply is activated to disconnect the power supply from the stacked transistors and load. Such a sensing and switching arrangement has disadvantages relating to cost and complexity, but more important, disconnecting the power supply from the stacked transistors interrupts the supply of power to a load. Such an interruption can have adverse effects on the user of the load, and may require overt action on the part of an operator to resume power.

It is, accordingly, an object of the present invention to provide a new and improved circuit for preventing simultaneous conduction of a plurality of switched transistors that are connected in a stacked relation across terminals of a DC power supply to supply chopped current to an inductive load.

Another object of the invention is to provide a new and improved relatively inexpensive circuit for supplying chopped current to an inductive load from a DC source, wherein the circuit includes a plurality of transistors stacked between the source terminals, and which transistors are normally driven so that current is supplied to the load from the source through the emitter-collector path of at least one transistor during a first interval while the emitter-collector path of a second transistor is cut off, and current can flow from the load through the emitter-collector path of the second transistor during a second interval while the emitter-collector path of the first transistor is cut-off. An additional object of the invention is to provide a new and improved, relatively inexpensive and simple circuit for positively preventing the tendency for simultaneous, destructive currents to flow from a DC source through the emitter-collector paths of a plurality of stacked transistors which are normally activated so that they are alternately switched to supply chopped current to an inductive load.

DISCLOSURE OF INVENTION

In accordance with the present invention, any tendency for simultaneous conduction of stacked transistors, connected across terminals of a DC power supply, which are switched to supply chopped current to an inductive load, is obviated by use of a bridge circuit connected between emitter-collector paths of a pair of the stacked power transistors. The bridge circuit is connected to the load and a bias circuit for one of the transistors and responds to the current flowing through one of the transistors to prevent the simultaneous conduction. The bridge circuit preferably includes only four semiconductor diodes and is therefore relatively inexpensive.

The bridge includes first, second, third and fourth legs, each having a single diode, with the four diodes being poled in the same direction for current flow between terminals of the DC source. The first and second legs have a common connection to the emitter-collector path of a first transistor so that current flowing through the emitter-collector path of the first transistor flows in parallel in the first and second legs. The third and fourth legs have a common connection to the emitter-collector path of the second transistor so that current flowing through the emitter-collector path of the second transistor flows in parallel in the third and fourth legs. There is a common connection for the first and third legs to a base of one of the transistors and a common connection for the second and fourth legs to a terminal of the load, having a second terminal connected to a power supply terminal.

Because of the inherent properties of the semiconductor diodes and power transistors, both of which are preferably fabricated of the same material, usually silicon, any current flow through the first leg would bias the base of the first transistor into a cutoff state. Such a result is achieved by utilizing a Darlington configuration for the power transistors. A Darlington silicon power transistor has two diodes effectively between its emitter and base while the first leg of the bridge has only a single silicon diode in it, whereby current flow through the first leg results in about a positive to negative 0.7 volt drop across the leg and between the emitter-base electrodes of transistor, which require approximately a negative to positive 1.4 volt drop between emitter and base to be forward biased.

The diode bridge is effectively a symmetrical element. Symmetry occurs because the voltage drop across all diodes of a particular type is virtually the same once the diode is activated into a conducting state. The symmetrical properties of the diode bridge also assure that only one of the transistors is conducting at a time.

The diode bridge also enables the present invention to be utilized as a neutral switch, whereby the voltage across the output terminal can vary from zero to the power supply voltage when both of the transistors are off. The neutral switch result is achieved because the load output terminals are effectively decoupled from base bias circuits for the first transistor when neither of the transistors is conducting, which results in the diodes of the bridge being cut off. Hence, the bridge is effectively switched from a balanced condition, when the second transistor is conducting, to an unbalanced, isolating circuit when neither of the transistors is conducting.

It is, accordingly, a further object of the present invention to provide a new and improved neutral switch for an inductive, power load.

The invention is particularly applicable to situations wherein a load is supplied with a DC power supply voltage of 100 volts or more and one or more amperes. Typically, the invention is to be utilized with loads in the range of between 100 watts and 1 kilowatt. For higher power loads, the power consumed by the bridge diodes is a consideration and tends to offset the initial relatively low cost of the bridge.

It is, therefore, a further object of the invention to provide a new and improved circuit for preventing simultaneous conduction of a pair of transistors that are switched across a voltage source of 100 volts or more and which are adapted to supply chopped current to an inductive load requiring between approximately 100 and 1000 watts.

A further object of the invention is to provide a new and improved neutral switching circuit which enables loads consuming between 100 and 1000 watts to float anywhere in the range from zero volts to a power supply voltage of 100 volts or more.

The above and still further objects, features, and advantages of the present invention will become apparent upon consideration of the following detailed description of one specific embodiment thereof, especially when taken in conjunction with the accompanying drawing.

BEST MODE FOR CARRYING OUT THE INVENTION

Figure 1:
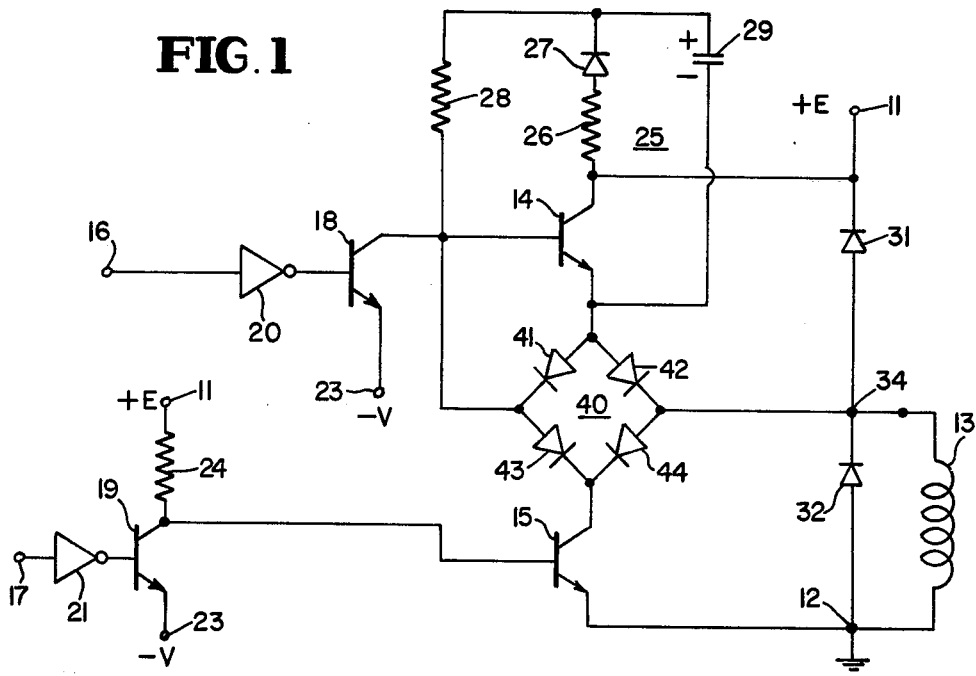
FIG. 1 is a circuit diagram of an embodiment of the invention, showing the basic principles thereof.

Reference is now made to FIG. 1 of the drawings wherein power from a DC power supply, connected between positive high voltage terminal 11 and ground terminal 12, is supplied to an inductive, relatively high power load 13, such as circuits including a motor, heating coil or lamp. The voltage at terminal 11 is typically 100 volts or more and load 13 requires one or more amperes; for the particular circuit, the minimum and maximum power requirements of load 13 are typically 100 and 1000 watts, respectively.

The DC voltage at terminal 11 is chopped by stacked, silicon NPN Darlington transistors 14 and 15, driven in out-of-phase relationship so that they are normally never simultaneously conducting. Transistors 14 and 15 are driven by a notched waveform including pulses of differing widths, which when smoothed, approximate a sine wave. Smoothing is inherently performed by a filtering action on the current supplied to it by inductive load 13. Notched waveforms, having relative phases of 180°, are applied to the bases of transistors 14 and 15 in response to 180° phase displaced, low power, notched voltage variations respectively applied to terminals 16 and 17. The voltages at terminals 16 and 17 are respectively applied to the bases of transistors 18 and 19 by inverter drivers 20 and 21. The emitters of transistors 18 and 19 are connected to a negative DC power supply terminal 23, typically maintained at a voltage level on the order of −6volts. The collector of transistor 19 is connected to positive DC power supply voltage terminal 11 via load resistor 24, while the collector of transistor 18 is supplied with a positive bias voltage via bootstrapping circuit 25 to drive transistor 14. The collectors of transistors 18 and 19 are respectively DC coupled to the bases of transistors 14 and 15.

In response to transistor 18 being forward biased by the output of driver 20, the negative voltage at terminal 23 is applied through the emitter-collector path of transistor 18 to the base of transistor 14, to prevent the flow of current to the base of transistor 14, i.e., to cut off transistor 14. Simultaneously, the output of driver 21 back biases the base of transistor 19, whereby the base of transistor 15 is supplied with a positive current derived from a constant current source including resistor 24, to cause transistor 15 to be forward biased, into a conducting stage. In response to transistors 18 and 19 now being oppositely biased, current is applied to the base of transistor 14 from terminal 11, through bootstrap resistor 26 and forward biased diode 27, as well as through resistor 28; at the same time, transistor 15 is cut off because current flows away from its base through the emitter-collector path of transistor 19.

Bootstrap circuit 25 also includes capacitor 29, connected between the emitter of transistor 14 and a common junction for the cathode of diode 27 and resistor 28. Capacitor 29 is charged in response to current flowing from terminal 11 through resistor 26 and diode 27, so that the capacitor electrode connected to the cathode of diode 27 is greater than the voltage on the electrode connected directly to the emitter of transistor 14. The time constant of boot-strap circuit 25 is such that there is no substantial discharge of capacitor 29 during the interval while transistor 14 is conducting.

Each of transistors 14 and 15 can be considered as an effective bilateral switching element because the emitter-collector paths thereof are respectively shunted by diodes 31 and 32. Diodes 31 and 32 are connected so that they are poled oppositely from the direction of current flow through the emitter-collector paths of transistors 14 and 15. In particular, diode 31 is connected so that the anode and cathode thereof are respectively connected to load output terminal 34 and power supply terminal 11, while the anode and cathode of diode 32 are respectively connected to ground terminal 12 and output terminal 34. It is necessary to provide bilateral switching elements 31 and 32 because of the inductive nature of load 13 and the switched operation of transistors 14 and 15. Diodes 31 and 32 enable currents to continue to flow in load 13 after switching of transistors 14 and 15 so that excessive voltages are not produced in the circuit and deleterious results do not occur to the circuit elements, as well as to the load.

The bootstrap circuit just described in connection with FIG. 1 is generally known. In accordance with the present invention, any tendency for the transistors 14 and 15 to conduct simultaneously is prevented by the utilization of the relatively inexpensive diode bridge 40, including first, second, third and fourth legs, respectively including diodes 41, 42, 43 and 44. Diodes 41–44 are fabricated from the same type of semiconductor material as Darlington transistors 14 and 15; preferably, both the diodes and the Darlington transistors are fabricated of silicon, whereby there is a 0.7 voltage drop across any of the conducting diodes and a 1.4 volt drop between the base and emitter of a conducting Darlington transistor. The 1.4 volt drop between the base and emitter of the conducting Darlington transistor occurs because there are effectively two series connected diodes between the base and emitter of a Darlington transistor.

The diodes of bridge 40 are interconnected to prevent simultaneous conduction of transistors 14 and 15, regardless of the tendency of the voltages applied to the bases of these transistors to render them simultaneously into a conducting state. Bridge 40 is interconnected with transistors 14 and 15 in such a manner that current flow through transistor 15 prevents current flow through transistor 14. The result is achieved because of the balanced nature of bridge 40, as well as because of the voltage drops across the semiconductor elements while they are conducting.

The connections of bridge 40 are such that all of the diodes 41–44 are poled to conduct current in the same direction from DC power supply terminal 11 to ground terminal 12. There is a common connection for the anodes of diodes 41 and 42 to the emitter of transistor 14 and a common connection for the cathodes of diodes 43 and 44 to the collector of transistor 14. There is a common connection for the cathode of diode 41 and the anode of diode 43 to the base of transistor 14 and a common connection for the cathode of diode 42 and anode of diode 44 to load terminal 34.

In normal operation, with transistor 14 conducting and transistor 15 cut off, current flows from power supply terminal 11 through the emitter-collector path of transistor 14 and through diode 42 to terminal 34 and load 13 to ground terminal 12. With transistor 14 in a conducting state, the voltage at output terminal 34 is maintained substantially at the voltage of DC power supply terminal 11. During this interval, current can flow from terminal 34 into load 13 via the emitter-collector path of transistor 14 and the anode-cathode path of diode 42. Also, while transistor 14 is in a conducting state, current can flow from load 13 into terminal 34 and through the anode-cathode path of diode 31 to DC power supply terminal 11. Such current through diode 31 is likely to occur immediately after transistor 14 has been activated into a conducting state and transistor 15 has been activated to cut off.

When transistor 15 is activated into a forward biased, conducting state, output terminal 34 is maintained substantially at the potential of ground terminal 12. During this interval, current can flow from load 13 through terminal 12 and diode 32 into output terminal 34, or it can flow in the opposite direction from load 13 through terminal 34 and the anode-cathode path of diode 44, as well as the emitter-collector path of transistor 15. While transistor 15 is forward biased, current also flows from terminal 11 through resistor 26 and diode 27 to charge capacitor 29. The current flowing through capacitor 29 flows through diodes 42 and 44 and through the emitter-collector path of transistor 15 to ground terminal 12. This is a relatively small charging current to restore the charge of capacitor 29. Some of the current flowing from terminal 11 through resistor 26 and diode 27 also flows through resistor 28 and the emitter-collector path of transistor 18 to terminal 23, to draw current from the base of transistor 14 and assure cut off of that transistor. Current from terminal 11 also flows through resistor 26, diode 27, resistor 28 and diode 43 to the emitter-collector path of transistor 15 while transistor 15 is conducting. Because there is a 0.7 voltage drop between the anode and cathode of each of diodes 43 and 44, the voltages at terminal 34 and the base of transistor 14 are substantially equal.

If, due to some aberration (such as failure of transistors 18 and 19 to switch simultaneously), there is a tendency for the drive applied to transistors 14 and 15 to cause simultaneous conduction of those transistors such a tendency is obviated by diode bridge 40. When such a tendency occurs, current flowing from the emitter of transistor 14, while transistor 15 is conducting, causes a 0.7 volt drop to be established across diode 41. Hence, the base of transistor 14 is 0.7 volts lower than the emitter of transistor 14. This action overcomes the tendency by holding off transistor 14 while transistor 15 is conducting. Transistor 14 is thus held off because, in response to transistor 15 conducting, the voltage at the collector of transistor 15 drops virtually to ground, whereby the voltages at the anode of diode 43 and at the anode of diode 44 are about equal. Thus, the voltage at the base of transistor 14 is equal to the voltage at the anode of diode 44, and the base voltage of transistor 14 is lower than the emitter voltage of transistor 14 and transistor 14 cannot conduct.

The circuit of FIG. 1 can also be employed as a neutral switch, enabling the voltage at terminal 34 to vary anywhere between the voltage at ground terminal 12 and the positive DC voltage at terminal 11. The circuit is operated as a neutral switch by simultaneously supplying negative bias voltages to terminals 16 and 17, whereby transistors 14 and 15 are simultaneously cut off. With transistors 14 and 15 both cut off, bridge 40 switches from a balanced to an unbalanced condition, whereby load terminal 34 is isolated from the base of transistor 14. With transistor 14 cut off, the bridge terminal between the cathode of diode 41 and the anode of diode 43 is maintained at the negative power supply voltage of terminal 23, due to the low impedance path through the emitter and collector of transistor 18. With a negative voltage applied to the common terminal for diodes 41 and 43, there can be no current flow from terminal 34 to the common point of diodes 41 and 43 because diodes 42 and 43 are back-biased.

Figure 2:
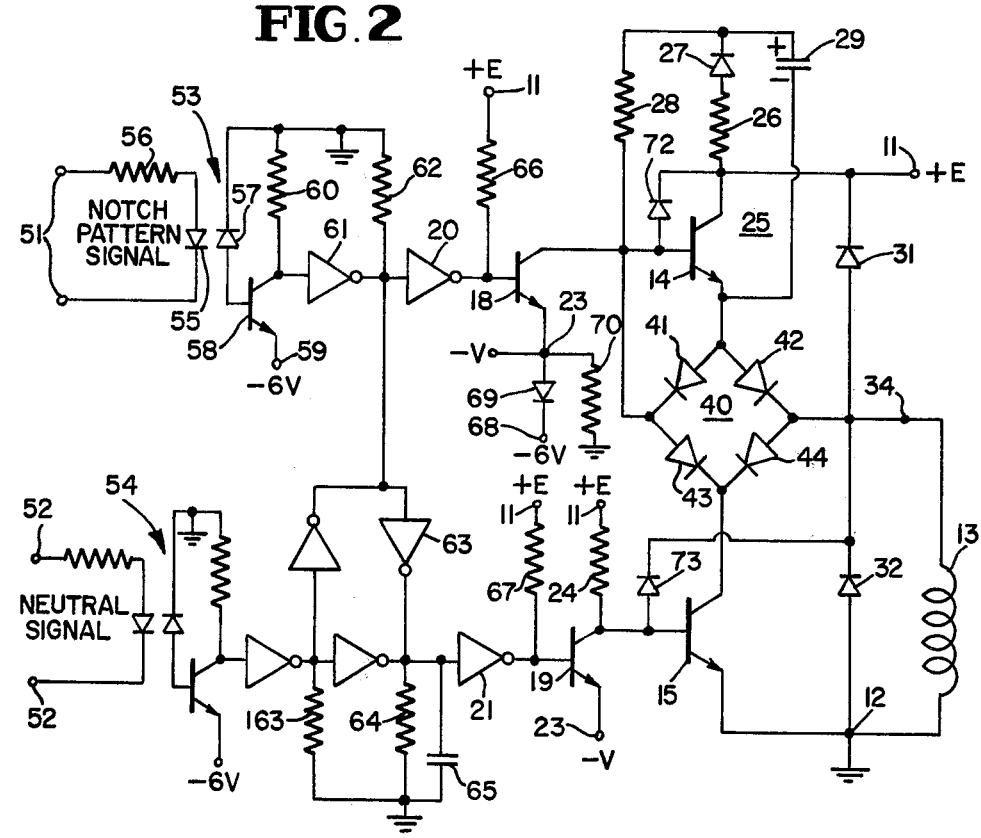
FIG. 2 is a circuit diagram of a complete embodiment of the invention.

Reference is now made to FIG. 2 of the drawing wherein there is illustrated a complete circuit diagram of a preferred embodiment of the invention. In FIG. 2, the components having like functions to the functions performed in FIG. 1 are not described in detail.

In FIG. 2, transistors 14 and 15 are selectively controlled in response to a notch pattern signal applied across terminals 51 or in response to a neutral signal applied across terminals 52. The notch pattern signal is always supplied to terminals 51, while terminals 52 are selectively responsive to the neutral signal, to enable terminal 34 to float between the voltages at DC power supply terminal 11 and ground terminal 12.

The notch pattern and neutral signals at terminals 51 and 52 are respectively supplied to opto-electronic circuits 53 and 54 which are substantially the same as each other, whereby a description of circuit 53 suffices for both. Circuit 53 includes light emitting diode 55, connected to terminals 51 by current limiting resistor 56. In response to diode 55 being forward biased, it emits optical energy that is detected by light sensitive diode 57. Diode 57 is connected between the base and collector of NPN transistor 58, having an emitter connected to a −6 volt DC power supply voltage at terminal 59. The collector of transistor 58 is connected to grounded load resistor 60. The collector of transistor 58 is connected to the input of inverting driver 61, having an output terminal connected to ground through load resistor 62.

In response to diode 55 being switched from a light emitting to a light cutoff condition, a rectangular wave, bi-level voltage is developed across resistor 62. The rectangular wave voltage developed across resistor 62 is a replica of the optical signal coupled to diode 57 and provides isolation for a low power drive to terminals 51. A similar result is attained by circuit 54, including output resistor 63, across which is developed a bi-level low power signal applied to terminals 52.

The voltage developed across resistor 62 is applied to the bases of transistor 14 and 15 in the out-of-phase relationship, described previously. The particular circuitry for applying the voltage developed across resistor 62 to the bases of transistors 14 and 15 includes inverting driver amplifiers 20 and 21, having negative 6 volt power supply terminals. The voltage applied to the input of amplifier 21 is coupled through inverter 63 to a delay network including shunt, parallel resistor 64 and capacitor 65.

The output terminals of amplifiers 20 and 21 are respectively connected to the positive DC power supply voltage at terminal 11 via resistors 66 and 67. Thereby, the bases of transistors 18 and 19 are normally forward biased and are activated into a back-biased condition only in response to a positive voltage being applied to the inputs of amplifiers 20 and 21, whereby a −6 volt output is developed across the output of amplifiers 20 and 21. The voltage applied to the emitters of transistors 18 and 19 is slightly smaller than the −6 volt output of each of amplifiers 20 and 21, by virtue of a bias circuit at the emitters of transistors 18 and 19. The bias circuit includes a −6 volt power supply terminal 68, connected to the cathode of diode 69; diode 69 has an anode that is connected to a common terminal 23 for the emitter of transistor 18 and load resistor 70. A −5.3 voltage level is therefore developed at terminal 23 and applied to the emitter of transistor 19, as well as to the emitter of transistor 18. Unidirectional current paths are respectively provided around the bases of transistors 14 and 15 by diodes 72 and 73 to prevent transistors 14 and 15 from ever being biased too deeply into saturation. Diode 72 is connected directly in shunt with the base and collector of transistor 14 so that the anode and cathode of the diode are respectively connected to the base and collector of the transistor. Diode 73 is connected so that the anode thereof is connected directly to the base of transistor 15, while the cathode of the transistor is connected directly to terminal 34.

While there has been described and illustrated one specific embodiment of the invention, it will be clear that variations in the details of the embodiments specifically illustrated and described may be made without departing from the true spirit and scope of the invention as defined in the appended claims.

I claim:

1. In a circuit wherein chopped current is supplied to an inductive load from a DC source that is switched by first and second transistors having emitter-collector paths stacked between terminals of the source, the transistors having bases driven so that current can be supplied to the load from the source through the emitter-collector path of the first transistor during a first interval while the emitter-collector path of the second transistor is cut off and the current can flow from the load through the emitter-collector path of the second transistor during a second interval while the emitter-collector path of the first transistor is cut off, the improvement comprising: a bridge circuit connected between the emitter-collector paths to the load, and to a bias circuit for two of the transistors for preventing current flow through the emitter-collector path of one of the transistors while the other transistor is conducting regardless of tendencies of the transistors to be simultaneously rendered in a conducting state.

2. The circuit of claim 1 further including means for simultaneously driving both the transistors into a cutoff state so that a voltage across the load can float between the voltage of the power supply terminals.

3. The circuit of claim 1 or 2 wherein the bridge circuit is a diode bridge.

4. The circuit of claim 1 or 2 wherein the bridge circuit includes first, second, third and fourth legs with diodes poled in the same direction for current flow between the terminals of the DC source, the first and second legs having a common connection to the emitter-collector path of the first transistor so that current flowing through the emitter-collector path of the first transistor flows in parallel in the first and second legs, the third and fourth legs having a common connection to the emitter-collector path of the second transistor so that current flowing through the emitter-collector path of the second transistor flows in parallel in the third and fourth legs, a common connection for the first and third legs to a base of one of the transistors, said last named common connection having a tendency to bias the base of the one transistor into a cutoff state in response to current flow through the first leg, a common connection for the second and fourth legs to a terminal of the load.

5. The circuit of claim 4 wherein the first and second legs are being arranged so that when current flows through them there are substantially equal voltage drops across them, the third and fourth legs being arranged so that when current flows through them there are substantially equal voltage drops across them.

6. The circuit of claim 1 or 2 wherein the bridge circuit includes first, second, third and fourth legs with unidirectional conducting elements poled in the same direction for current flow between terminals of the DC source, the first and second legs having a common connection to the emitter-collector path of the first transistor so that current flowing through the emitter-collector path of the first transistor flows in parallel in the first and second legs, the third and fourth legs having a common connection to the emitter-collector path of the second transistor so that current flowing through the emitter-collector path of the second transistor flows in parallel in the third and fourth legs, a common connection for the first and third legs to a base of one of the transistors, said last named common connection having a tendency to bias the base of the one transistor into a cutoff state in response to current flow through the first leg, a common connection for the second and fourth legs to a terminal of the load.

7. The circuit of claim 6 wherein the first and second legs are arranged so that when current flows through them there are substantially equal voltage drops across them, the third and fourth legs being arranged so that when current flows through them there are substantially equal voltage drops across them.

8. The circuit of claim 7 wherein the voltage drop across the first leg while it is conducting is less than the voltage between the emitter and base of the one transistor necessary to activate the one transistor into a conducting state.

9. The circuit of claim 1 or 2 wherein the bridge circuit includes first, second, third and fourth legs with unidirectional elements poled in the same direction for current flow between the terminals of the DC source, the first and second legs having a common connection to the emitter-collector path of the first transistor so that current flowing through the emitter-collector path of the first transistor flows in parallel in the first and second legs, the third and fourth legs having a common connection to the emitter-collector path of the second transistor so that current flowing through the emitter-collector path of the second transistor flows in parallel in the third and fourth legs, a common connection for the first and third legs to a base of one of the transistors, the first and second legs being arranged so that when current flows through them there are substantially equal voltage drops across the first and second legs, the third and fourth legs being arranged so that when current flows through them there are substantially equal voltage drops across them.

10. The circuit of claim 9 wherein the first leg is a direct shunt across the emitter and base of the one transistor, the voltage drop across the first leg, while it is conducting, being of the opposite polarity and less than the voltage between the emitter and base of the one transistor necessary to activate the one transistor into a conducting state.

11. The circuit of claim 1 or 2 wherein a single semiconductor diode is included in each leg of the bridge, the diode in each leg being of the same semiconductor material, each of the transistors being of the same semiconductor material as the diodes and having a Darlington configuration.

12. The circuit of claim 1 or 2 further including first and second unidirectional conduction elements respectively shunting the emitter-collector paths of the first and second transistors and polarized to conduct current from the source in an opposite direction from the emitter-collector paths of the transistors.

13. The circuit of claim 1 or 2 further including a bootstrap circuit for supplying bias current to one of the transistors.

14. The circuit of claim 1 or 2 further including a separate diode for providing a shunt path around the base of each of the transistors for a voltage that tends to bias the transistors into the conducting state, the separate diodes being poled so that they conduct current in a direction opposite from the direction current is supplied to the transistors by the source.

15. A circuit for supplying chopped power to an inductive load from first and second terminals adapted to be energized by a DC power source, said terminals being at different DC voltage levels, comprising a plurality of power transistors stacked between the terminals so that emitter-collector paths of the power transistors are connected in series with each other between the terminals, the load being connected between the second terminal and a tap between a pair of transistors in the stack, means for supplying switching signals to bases of the transistors so that current can flow from the first terminal through an emitter-collector path of at least one of said transistors to the tap, load and second terminal during a first interval while current is prevented from flowing between the tap and second terminal through the emitter-collector path of at least another transistor, and so that current can flow from the load through the tap and an emitter-collector path of the another transistor to the second terminal during a second interval while current is prevented from flowing between the first terminal through the emitter-collector path of the one transistor to the tap, and bridge circuit means connector in the stack between the emitter and collector electrodes of the one and another transistors for preventing current from flowing through the one transistor while current is flowing through the another transistor regardless of the tendency of the switching signal to maintain the one and another transistors simultaneously conducting.

16. The circuit of claim 15 wherein said circuit means includes first, second, third and fourth unidirectional elements each having first and second electrodes so that current tends to flow from the first to the second electrode but not from the second to the first electrode, the first electrodes of the first and second elements being connected to a common electrode in the emitter-collector path of the one transistor, the second electrode of the third and fourth elements being connected to a common electrode in the emitter-collector path of the another transistor, the second and first electrodes of the second and fourth elements being respectively connected to the tap, the second and first electrodes of the first and third elements being respectively connected to be responsive to the switching signal applied to the base of the one transistor, the voltage drop across the first and second elements, while conducting, being approximately equal to each other but less than the voltage between the base and emitter of the one transistor necessary to enable current to flow in the emitter-collector path of the one transistor.

17. The circuit of claim 5 wherein the first leg is a direct shunt across the emitter and base of the one transistor, the voltage drop across the first leg, while it is conducting, being of the opposite polarity and less than the voltage between the emitter and the base of the one transistor necessary to activate the one transistor into a conducting state.

18. The circuit of claim 11 wherein the semiconductor material is silicon.

19. The circuit of claim 3 wherein a single semiconductor diode is included in each leg of the bridge, the diode in each leg being of the same semiconductor material, each of the transistors being of the same semiconductor material as the diodes and having a Darlington configuration.

20. The circuit of claim 19 wherein the semiconductor material is silicon.

21. The circuit of claim 4 wherein a single semiconductor diode is included in each leg of the bridge, the diode in each leg being of the same semiconductor material, each of the transistors being of the same semiconductor material as the diodes and having a Darlington configuration.

22. The circuit if claim 21 wherein the semiconductor material is silicon.

23. A circuit for supplying chopped power to an inductive load from first and second terminals adapted to be energized by a DC power source, said terminals being at different DC voltage levels, comprising a plurality of switching devices stacked between the terminals, each of said switching devices having input and output terminals and a control terminal, a conducting path between the input and output terminals being established in response to the voltage applied to the control terminal exceeding the voltage applied to the input terminal by a predetermined level, the path being cut off in response to the voltage applied to the control terminal being less than the predetermined level relative to the voltage applied to the input terminal, the input and output electrodes of the devices being connected to each other so that the paths of the switching devices are connected in series with each other between the terminals, the load being connected between the second terminal and a tap between a pair of the devices in the stack, means for supplying switching signals to the control terminals of the devices so that current can flow from the first terminal through the path of at least one of said devices to the tap, load and second terminal during a second interval while current is prevented from flowing between the first terminal through the path of the one device to the tap, and bridge circuit means connected in the stack between the input and output electrodes of the one and another devices for preventing current from flowing through the one device while current is flowing through the another device regardless of tendencies of the devices to be simultaneously conducting.

24. The circuit of claim 22 further including means for simultaneously driving both the transistors into a cutoff state so that a voltage across the load can float between the voltage of the power supply terminals.

25. The circuit of claim 23 wherein said circuit means includes first, second, third and fourth unidirectional elements each having first and second electrodes so that current tends to flow from the first to the second electrode but not from the second to the first electrode, the first electrodes of the first and second elements being connected to a common terminal in the path of the one device, the second electrodes of the third and fourth elements being connected to a common terminal in the path of the other device, the second and first electrodes of the second and fourth elements being respectively connected to the tap, the second and first electrodes of the first and third elements being respectively connected to be responsive to the switching signal applied to the control terminal of the one device, the voltage drop across the first and second elements, while conducting, being approximately equal to each other but less than the voltage between the control terminal and input terminal of the one device necessary to enable current to flow in the path of the one device.

26. The circuit of claim 15 further including means for simultaneously driving both the transistors into a cutoff state so that a voltage across the load can float between the voltage of the power supply terminals.

27. The circuit of claim 6 wherein the first and second legs are arranged so that when current flows through them there are substantially equal voltage drops across them, the third and fourth legs being arranged so that when current flows through them there are substantially equal voltage drops across them and a single semiconductor diode is included in each leg of the bridge, the diode in each leg being of the same semiconductor material, each of the transistors being of the same semiconductor material as the diodes and having a Darlington configuration.

28. The circuit of claim 27 wherein the voltage drop across the first leg while it is conducting is less than the voltage between the emitter and base of the one transistor necessary to activate the one transistor into a conducting state.

* * * * *